(12) United States Patent
Jung et al.

(10) Patent No.: US 12,054,097 B2
(45) Date of Patent: Aug. 6, 2024

(54) TARGET IDENTIFICATION FOR VEHICLE SEE-THROUGH APPLICATIONS

(71) Applicant: Panasonic Automotive Systems Company of America, Division of Panasonic Corporation of North America, Peachtree City, GA (US)

(72) Inventors: Jin Woo Jung, Johns Creek, GA (US); Rajendramayavan Rajendran Sathyam, Peachtree City, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 315 days.

(21) Appl. No.: 17/548,409

(22) Filed: Dec. 10, 2021

(65) Prior Publication Data

US 2022/0185182 A1    Jun. 16, 2022

Related U.S. Application Data

(60) Provisional application No. 63/125,899, filed on Dec. 15, 2020.

(51) Int. Cl.
| | | |
|---|---|---|
| *B60R 1/00* | (2022.01) | |
| *B60K 35/00* | (2024.01) | |
| *B60K 35/22* | (2024.01) | |
| *B60K 35/60* | (2024.01) | |
| *G06T 7/70* | (2017.01) | |

(52) U.S. Cl.
CPC ............. *B60R 1/00* (2013.01); *B60K 35/00* (2013.01); *G06T 7/70* (2017.01); *B60K 35/22* (2024.01);
(Continued)

(58) Field of Classification Search
CPC ........ B60K 2370/152; B60K 2370/788; B60K 35/00; B60R 1/00; B60R 1/23;
(Continued)

(56) References Cited

U.S. PATENT DOCUMENTS

9,756,319 B2 * 9/2017 Di Censo ............... G08G 1/167
11,220,214 B1 * 1/2022 Meier ....................... B60R 1/28
(Continued)

FOREIGN PATENT DOCUMENTS

| JP | 2014198531 A | * 10/2014 | ............. B60K 35/00 |
| WO | WO-2014156788 A1 | * 10/2014 | ............. B60K 35/00 |
| WO | WO-2016185678 A1 | * 11/2016 | ............... B60R 1/00 |

*Primary Examiner* — Babar Sarwar
(74) *Attorney, Agent, or Firm* — Laurence S. Roach, Esq.

(57) ABSTRACT

Examples of the disclosure relate to example systems and methods for operating a see-through display for a vehicle. An example system includes a video camera positioned to capture video related to a vehicle structure that blocks a view of the driver. The system also includes a see-through display disposed inside the vehicle between the vehicle structure and the driver. The system also includes a processor configured to identify a closest object within a field of view of the video camera, determine a distance to the closest object, and process the captured video based, at least in part, on the distance to determine a portion of the captured video to be displayed on the see-through display. The processor renders the portion of the captured video to create a see-through effect relative to the vehicle structure.

18 Claims, 7 Drawing Sheets

(52) U.S. Cl.
CPC ........ *B60K 35/60* (2024.01); *B60K 2360/788* (2024.01); *B60R 2300/20* (2013.01); *B60R 2300/802* (2013.01); *G06T 2207/30252* (2013.01); *G06T 2215/00* (2013.01)

(58) Field of Classification Search
CPC .......... B60R 2300/20; B60R 2300/202; B60R 2300/802; G06T 2207/30252; G06T 2215/00; G06T 7/70
See application file for complete search history.

(56) References Cited

U.S. PATENT DOCUMENTS

| | | | | |
|---|---|---|---|---|
| 11,697,408 B2* | 7/2023 | Yamanaka | ............ | B60W 30/06 701/23 |
| 11,787,335 B2* | 10/2023 | Watanabe | ................ | G06T 7/70 345/419 |
| 2011/0043632 A1* | 2/2011 | Satoh | ........................ | B60R 1/00 348/E7.083 |
| 2012/0113261 A1* | 5/2012 | Satoh | ........................ | B60R 1/00 348/148 |
| 2013/0021446 A1* | 1/2013 | Raz | ........................ | H04N 13/139 348/47 |
| 2016/0003636 A1* | 1/2016 | Ng-Thow-Hing | ... | G01C 21/365 701/418 |
| 2017/0132476 A1* | 5/2017 | Chien | .................. | H04N 23/698 |
| 2017/0291493 A1* | 10/2017 | Bostick | .................. | B60K 35/10 |
| 2018/0222320 A1* | 8/2018 | Kochiya | .................. | B60R 1/26 |
| 2020/0023772 A1* | 1/2020 | Kurnaz | ..................... | G06T 5/90 |
| 2020/0189467 A1* | 6/2020 | Kondo | .................. | G01S 13/865 |
| 2021/0051264 A1* | 2/2021 | Prabhakar | .............. | H04N 23/70 |
| 2021/0110715 A1* | 4/2021 | Sherony | .................. | B60W 30/095 |
| 2021/0170949 A1* | 6/2021 | Guirlanda | ................. | B60R 1/12 |
| 2022/0191349 A1* | 6/2022 | Chapman | ............. | H04N 5/2228 |

* cited by examiner

TARGET IDENTIFICATION FOR VEHICLE SEE-THROUGH APPLICATIONS

CROSS-REFERENCE TO RELATED APPLICATIONS

This application claims the benefit of U.S. Provisional Application No. 63/125,899, filed on Dec. 15, 2020, the disclosure of which is hereby incorporated by reference in its entirety for all purposes.

FIELD OF THE INVENTION

The present disclosure generally relates to a method, system, and device for providing see-through effects in a vehicle.

BACKGROUND

This section is intended to introduce the reader to various aspects of art, which may be related to various aspects of the present disclosure, which are described and/or claimed below. This discussion is believed to be helpful in providing the reader with background information to facilitate a better understanding of the various aspects of the present disclosure. Accordingly, it can be understood that these statements are to be read in this light, and not as admissions of prior art.

The operation of motor vehicles depends on the driver having good visibility of the environment outside of the vehicle. However, depending on the vehicle's design, there are generally areas of the outside environment that are blocked from view. For example, the frames of most vehicles have structural components that support the vehicle's roof. Such structural components can create blind spots.

SUMMARY

The present disclosure generally relates to techniques for implementing a see-through system for a vehicle. An example system in accordance with embodiments includes a video camera positioned to capture video related to a vehicle structure that blocks a view of the driver, and a see-through display disposed inside the vehicle between the vehicle structure and the driver. The example system also includes a processor configured to identify a closest object within a field of view of the video camera, and determine a distance to the closest object. The processor is further configured to process the captured video based, at least in part, on the distance to determine a portion of the captured video to be displayed on the see-through display. The processor is also configured to render the portion of the captured video to create a see-through effect relative to the vehicle structure.

BRIEF DESCRIPTION OF THE DRAWINGS

The above-mentioned and other features and advantages of the present disclosure, and the manner of attaining them, may become apparent and be better understood by reference to the following description of one example of the disclosure in conjunction with the accompanying drawings, where.

Correlating reference characters indicate correlating parts throughout the several views. The exemplifications set out herein illustrate examples of the disclosure, in one form, and such exemplifications are not to be construed as limiting in any manner the scope of the disclosure.

DETAILED DESCRIPTION OF EXAMPLES

One or more specific examples of the present disclosure are described below. In an effort to provide a concise description of these examples, not all features of an actual implementation are described in the specification. It can be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it can be appreciated that such a development effort might be complex and time consuming, and is a routine undertaking of design, fabrication, and manufacture for those of ordinary skill having the benefit of this disclosure.

This disclosure describes techniques for providing see-through applications in a vehicle. Most vehicles include structures that tend to block the view of the driver. Examples of such structures include the pillars that support the vehicle's roof. For example, pillars known as "A pillars" are those pillars that hold the windshield in place. The pillars known as "C pillars" are those pillars that hold the vehicle's rear window in place. Some vehicles also have "B pillars" that are positioned at the end of the first door. These support structures have the potential to block the driver's view and create blind spots.

In accordance with embodiments disclosed here, the driver's visibility is enhanced by creating a see-through effect for some vehicle structures. This can be accomplished by placing a display screen inside the vehicle between the vehicle structure and the driver and positioning a camera on the opposite side of the structure outside of the vehicle. The image captured by the camera is then displayed on the display screen to create the illusion that the portion of the vehicle covered by the display screen is see-through, i.e., invisible.

To provide a suitable user experience, the image displayed on the display screen should be oriented so that it matches the perspective of the driver. In other words, the view of that is not blocked by the vehicle structure should appear to the driver to be closely aligned with the image that is displayed by the see-through display. The present disclosure describes techniques that enable such close alignment. In some embodiments, the proper alignment is achieved by identifying a target object that will be rendered to the see-through display, determining the distance to the target object, and adjusting the rendered image accordingly. The present disclosure will be better understood with reference to the following figures.

Figure 1:
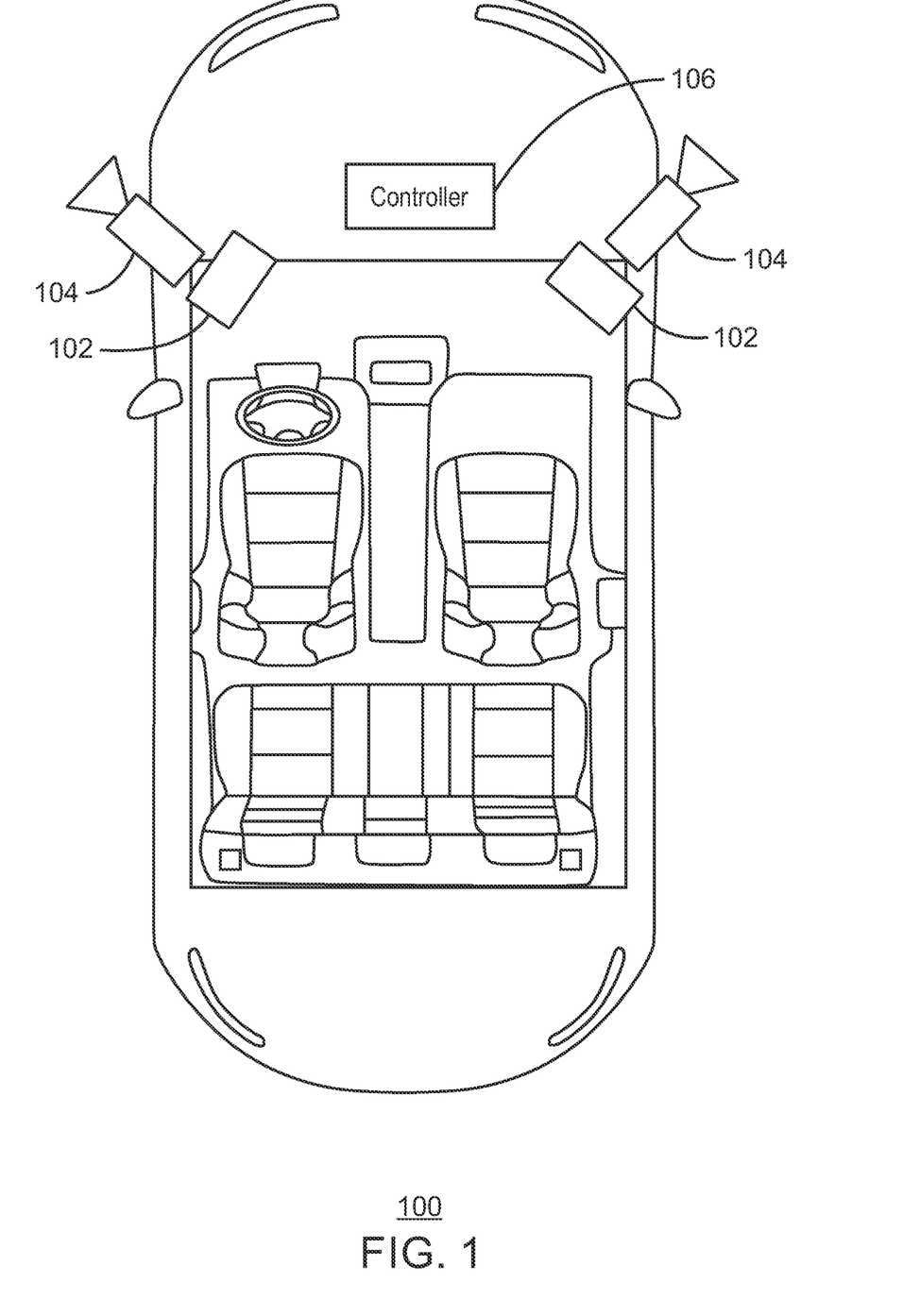
FIG. 1 is an example of a vehicle configured with a see-through system.

FIG. 1 is an example of a vehicle configured with a see-through system. Embodiments of the present techniques may be described in the context of a vehicle such as an automobile. However, the techniques may be used in substantially any type of vehicle, including aircraft, watercraft, busses, and others.

As shown in FIG. 1, the system 100 includes two see-through displays 102 positioned inside the vehicle over the A-pillars and oriented to face the interior of the vehicle so as to be visible the driver. Additionally, video cameras 104 are coupled to the A-pillars outside of the automobile and oriented to face away from the automobile to capture the view blocked by the A-pillars.

The system 100 also includes a controller 106. The controller 106 may be implemented as processing hardware or a combination of hardware and software. For example, the controller 106 may be implemented on a microprocessor such as an Application Specific Integrated Circuit (ASIC), as software or firmware executing on a general purpose processor, and the like. The controller 106 can also include electronic memory for storing instructions and data, such as pre-programmed data and/or data collected from sensors in the vehicle. Additionally, the controller 106 may be a dedicated controller that is dedicated to the see-through application, or the controller 106 may be implemented as a feature of a general purpose automobile computing system such as the automobile's infotainment head unit.

Video data from the cameras 104 is sent to the controller 106, processed by the controller 106, and sent from the controller 106 to the displays 102 for rendering. The processing of the video data includes determining what segment of the video captured by the cameras 104 is sent to the displays 102, which may depend, at least in part, on the eye position of the user, the position of the camera, the field of view of the camera, and the distance to the objects that are being displayed. The process for determining the segment of the video images to render is described further in relation to FIGS. 3 to 5.

Although the example system 100 shown in FIG. 1 includes two see-through displays 102 positioned to provide a see-through effect relative to the automobile's A-Pillars, it will be appreciated that other configurations are also possible. For example, the system 100 can include a single see-through display or multiple see-through displays. Additionally, the see-through displays may be positioned in relation to any other vehicle structure that blocks the driver's view, such as the B-pillars, the C-pillars, the doors, the hood, and others.

Figure 2A:
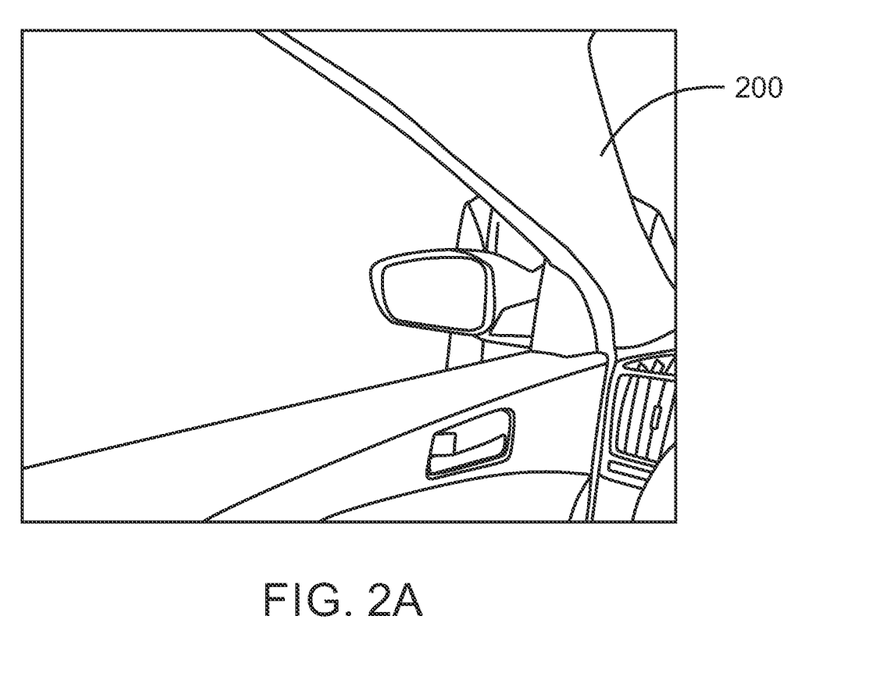
FIG. 2A shows a driver perspective from inside a vehicle without a see-through display.

FIG. 2A shows a driver perspective from inside a vehicle without a see-through display. As shown in FIG. 2A, there appears to be an object outside the vehicle, but the view is obstructed by the A-pillar 200. From this, it can be appreciated that the driver's view is obstructed such that the driver may not realize that there is an object in close proximity to the vehicle.

Figure 2B:
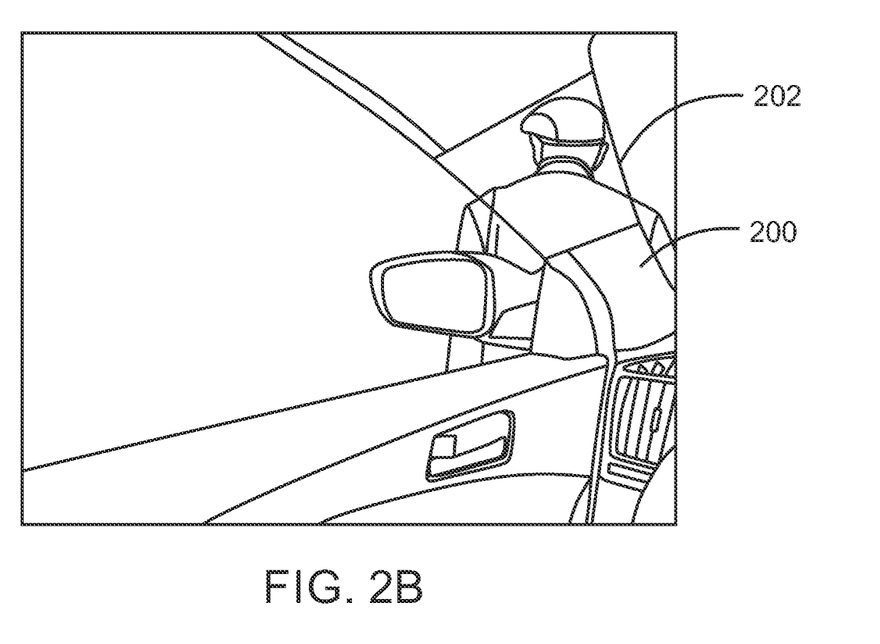
FIG. 2B shows the driver perspective from inside a vehicle with a see-through display positioned in relation to the A-pillar.

FIG. 2B shows the driver perspective from inside a vehicle with a see-through display positioned in relation to the A-pillar. As shown in FIG. 2B, the portion of the A-pillar 200 covered by the display 202 now appears to be transparent. This allows the driver to more easily recognize that there is a person in close proximity to the vehicle and can exercise an appropriate degree of caution. To create the illusion of transparency, the video rendered on the display 202 should align closely with the real-world view that is not obstructed by the A-pillar. To achieve this close alignment, the video displayed may be adjusted depending on the distance to the target object, which is the person in this case.

Figure 2C:
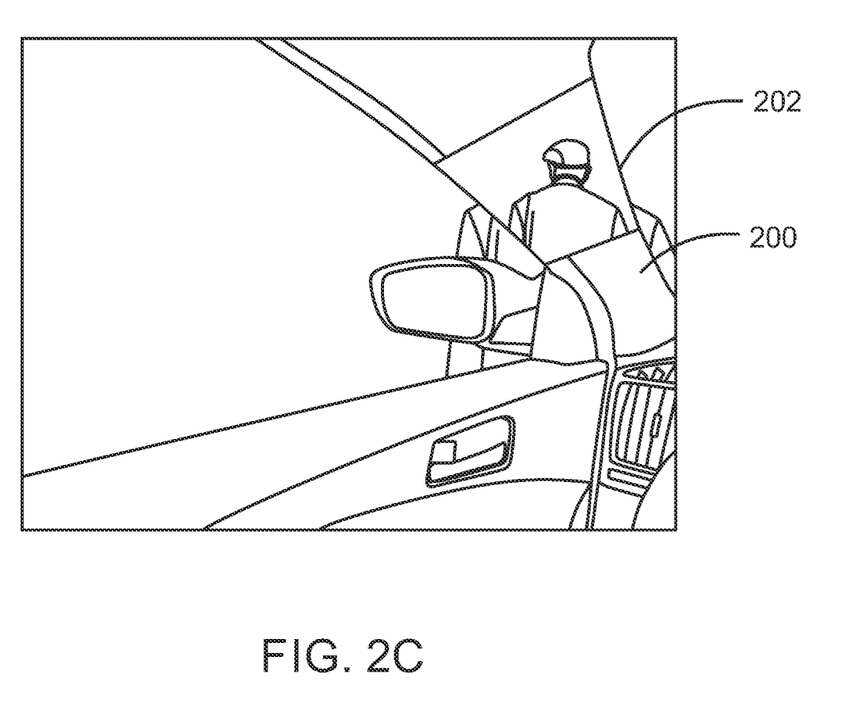
FIG. 2C shows the see-through display of FIG. 2B wherein the rendered image is misaligned with the real-world view.

FIG. 2C shows the see-through display of FIG. 2B wherein the rendered image is misaligned with the real-world view. As shown in FIG. 2C, a see-through display is disposed on a portion of the A-pillar 200. However, the image being displayed does not match with the driver's view of the scenery that is not blocked by the A-pillar 200. Specifically, in this example, the displayed images appear to be too small, compared to the real-world view. As explained further in relation to FIG. 3, this effect is caused, in part, by the distance of the person from the camera. The result is that the illusion of transparency is broken.

Figure 3:
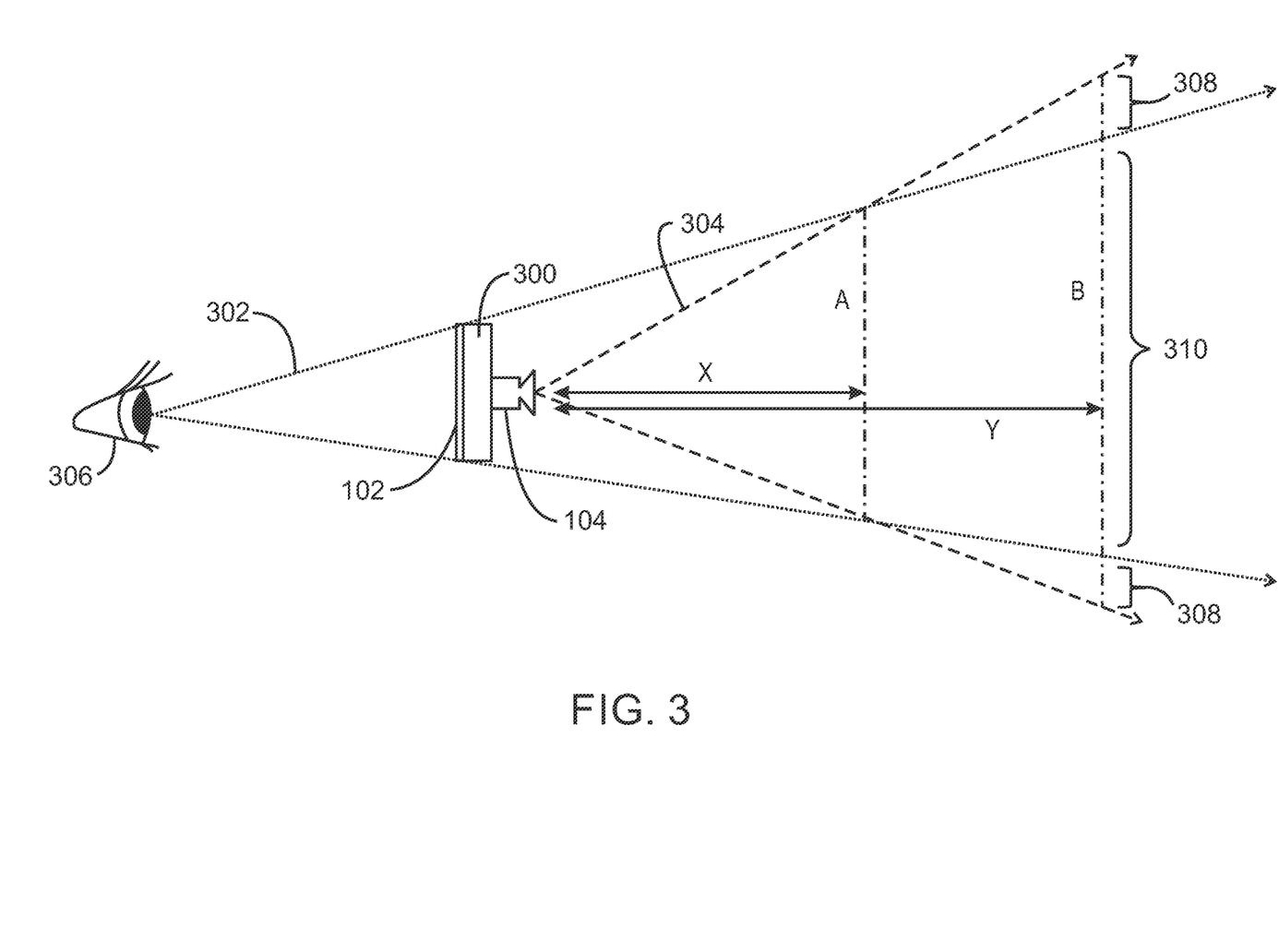
FIG. 3 is a schematic illustrating a technique for adjusting the video images to be displayed to a see-through display.

FIG. 3 is a schematic illustrating a technique for adjusting the video images to be displayed to a see-through display. FIG. 3 shows a camera 104 positioned on a vehicle component 300 that blocks the view of the driver, such as an A-pillar. The camera 104 is disposed on the opposite side of the vehicle component 300 from the driver and captures video images to be rendered to the see-through display 102. That part of the driver's view that is blocked by the vehicle component 300 is represented by the cone 302 (solid line) and is referred to herein as the "cone of blockage." The use of the term "cone" is not intended to imply that the volume of blocked space would actually be in the shape of a cone, since the blocked volume will depend on the shape of the component causing the blockage. The "view cone" of the camera, represented by the cone 304 (dotted line), represents the volume of space in which objects are visible to the camera.

Ideally, the camera's view cone would perfectly overlap with the cone of blockage. In this way, the images captured by the camera would always match with the scenery that is blocked from view. However, due to the distance between the camera 104 and the driver's eye 306, the camera's view cone and the driver's cone of blockage are not aligned. Thus, images captured by the camera 104 will not always be the same as the images blocked from the driver's view.

For example, line segment A represents the field of view of the camera 104 at distance X. At this distance, the view cone overlaps with the cone of blockage such that the field of view of the camera matches the field of blockage experienced by the driver. In this case, displaying the full images captured by the camera 104 would provide a suitable match with the visual perspective of the driver and a satisfactory user experience.

Line segment B represents the field of view of the camera 104 at distance Y. By comparing the camera's view cone and driver's cone of blockage at this distance, it can be appreciated that the camera's field of view encompasses areas that are no longer blocked for the driver. In this case, displaying the full images captured by the camera 104 would result in the driver seeing a smaller image on the see-through display 102 compared to the driver's real world view of the external scenery. This is demonstrated in FIG. 2C. Conversely, at distances closer than distance X, some areas that are blocked for the driver would also not be within the camera's field of view. Thus, the displayed images, if displayed in full, would appear larger than they really are from the driver's perspective.

To mitigate this effect, the images captured by the camera 104 can be processed based on the distance to a target object to be displayed. The target object can be considered to be the object that is of higher importance compared to other objects that may be within the field of view of the camera 104. In some embodiments, the target object may be selected to be the closest object within the camera's field of view. In some embodiments, processing the captured images means cropping the images to eliminate areas within the camera's field of view that are not blocked for the driver, i.e., are not in the driver's cone of blockage. The size of the area of the captured images that are cropped will depend on the distance to the target object and will be proportionately larger as the distance to the target object increases. For example, at distance X, the captured images can be displayed in full, i.e., without cropping. At distance Y, the area 308 of the captured images that are outside the blockage cone will be cropped. The remaining images after cropping 310 can be displayed on the see-through display 102 such that they fully encompass the display screen. Thus, the portion of the captured images that are not cropped will be magnified to fit the full screen of the see-through display 102. The cropping process may also depend on the eye position, which determines the spatial relationship between the driver's cone of blockage and the camera's view cone.

Figure 4:
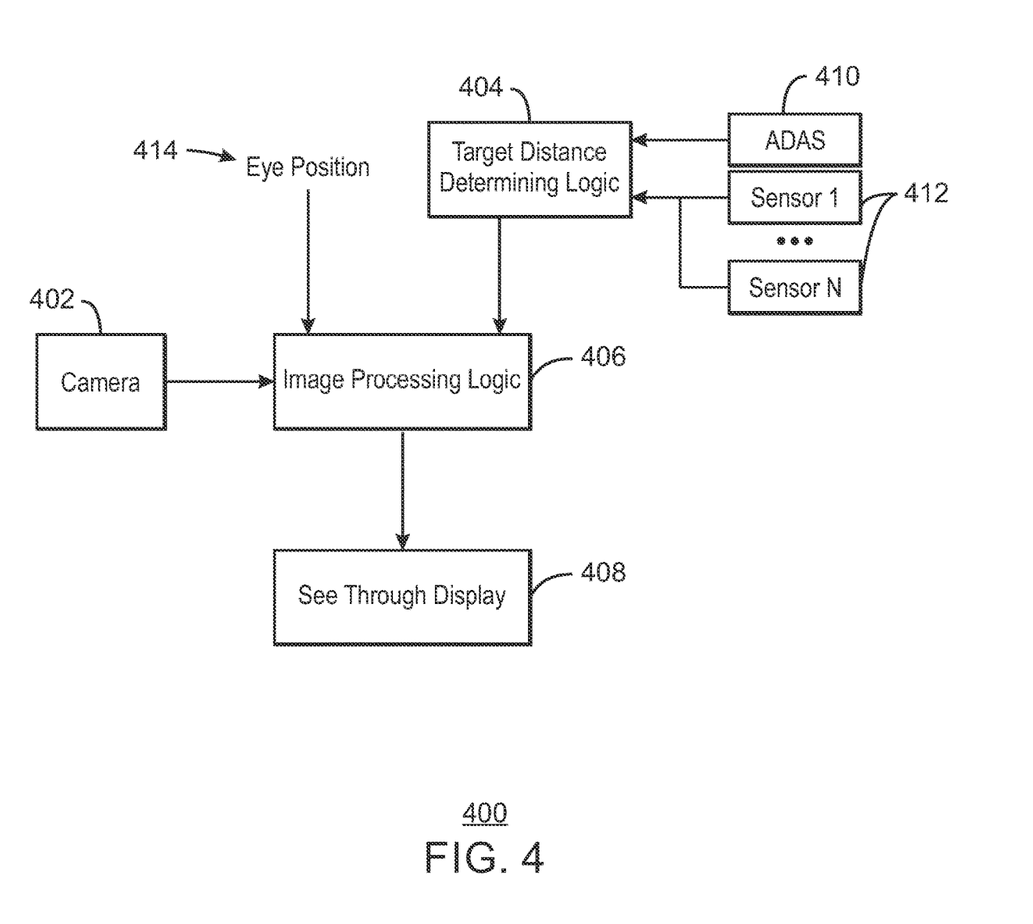
FIG. 4 is a block diagram of a system for implementing a see-through display for a vehicle in accordance with embodiments.

FIG. 4 is a block diagram of a system for implementing a see-through display for a vehicle in accordance with embodiments. The system 400 may be implemented in any suitable computer logic, including processing hardware or a combination or hardware and software. At least some of the blocks may be included in the controller 106 of FIG. 1.

The system 400 includes a camera 402, target distance determining logic 404, image processing logic 406, and a see through display 408. The camera 402 can be any suitable video camera and captures images to be displayed on the see-through display. The camera sends captured images to the image processing logic 406, which processes the captured images and renders the processed images to the see-through display 408. The image processing logic 406 processes the captured images to ensure that the rendered images provide a good match for the user's view of the unblocked scenery. The processing performed by the image processing logic 406 may include cropping the captured images, magnifying the captured images, and/or shrinking the captured images. The image processing may be performed based, at least in part, on using a target distance received from the target distance determining logic 404 as an input.

The target distance determining logic 404 is configured to determine the target distance to be used for processing the captured images. The target distance determining logic 404 may be configure to identify a target object, determine the distance to the target object, and send this distance (the target distance) to the image processing logic 406. The target object may be selected from one of several possible objects that may be in the field of view of the camera. In the event that no suitable object is selectable as the target object, the target distance may be set to a default value.

Various possible techniques may be used to obtain the target object and the target distance. In some embodiments, the target distance determining logic 404 is communicatively coupled to the vehicle's Advanced Driver-Assistance System (ADAS) 410. The ADAS 410 is an electronic system employed in some vehicles to provide advanced driving and parking functions, such as collision avoidance, lane centering assistance, adaptive cruise control, and others. The ADAS 410 may include various subsystems for detecting and identifying objects around the vehicle. Such subsystems can include radar subsystems, lidar subsystems, vehicle-to-vehicle communications systems, camera-based computer vision systems, and others. In vehicles equipped with an ADAS 410, the ADAS 410 can send information to the target distance determining logic 404 regarding the location of objects around the vehicle. The target distance determining logic 404 can then process this information to identify the target distance by, for example, determining the distance to the closest object within the camera's view cone.

The target distance determining logic 404 may also be coupled to one or more sensors 412, either in addition to the ADAS or instead of the ADAS. The sensors 412 may include, for example, proximity sensors, laser rangefinders, range cameras, and others. The information provided by the sensors 412 may be used in place of the ADAS or as an enhancement to the ADAS data to identify the target distance. In some embodiments, the camera 402 includes range finding capabilities and can communicate one or more object distances to the target distance determining logic 404.

In some embodiments, the eye position 414 of the driver is also used to process the captured images. The eye position may be a fixed, pre-defined eye position retrieved from memory. This pre-defined eye position may be determined to be a good average eye position most suitable for a large number of people. The eye position may also be a variable eye position that can be adjusted to try to match more closely the actual eye position of the driver. For example, in some embodiments, the eye position can be determined based on the position of the driver's seat. In such embodiments, the predefined eye position may be specified relative to the seat position, and the seat position can be detected and used to calculate the eye position.

The eye position 414 may also be received from an eye position subsystem that used to determine the actual position of the driver's eyes. The eye position subsystem may be an eye tracking subsystem that uses sensors such as cameras to identify the location of the driver's eyes. The eye position subsystem may also be a subsystem that enables the driver to provide manual input related to the position of the drivers eyes.

Once the target distance (and optionally the eye position) are received, the image processing logic 406 can process the captured images to determine what portion of the captured video is to be rendered on the see-through display 408. For example, the image processing logic 406 can determine how to size the images and/or how large of an area of the captured images to crop, if any. The system 400 may continuously update the target distance as described above as new data about objects in the vicinity of the vehicle is received.

Simplified examples are presented herein. However the teachings shown here can be extrapolated beyond the examples shown to include any number of different functionalities. Additionally, it is to be understood that the block diagram of FIG. 4 is not intended to indicate that the system 400 is to include all of the components shown in FIG. 4. Rather, the system 400 can include fewer or additional components not illustrated in FIG. 4.

Figure 5:
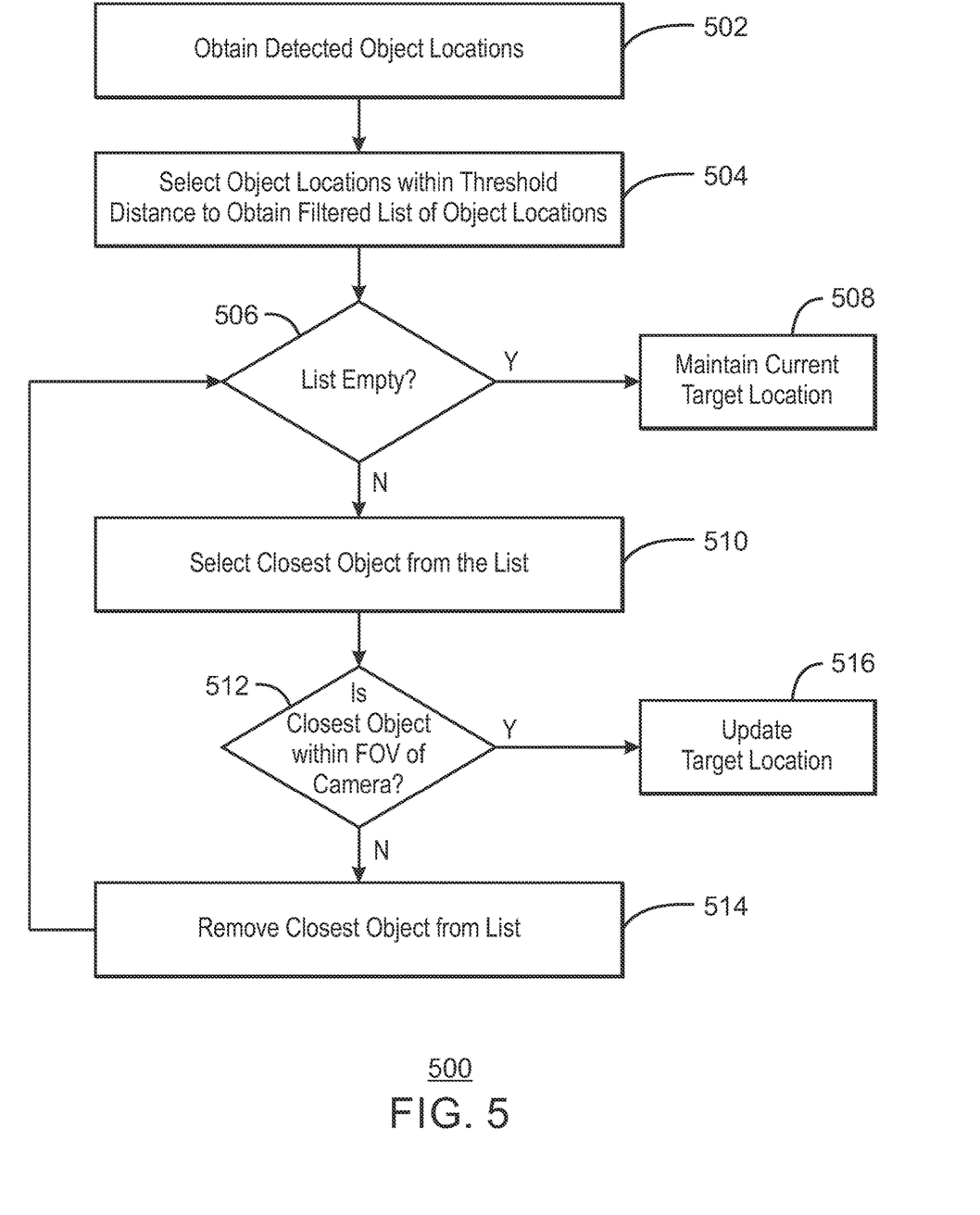
FIG. 5 is a process flow diagram of an example method for operating a see-through display for a vehicle in accordance with embodiments.

FIG. 5 is a process flow diagram of an example method for operating a see-through display for a vehicle in accordance with embodiments. Each of the functions of this method 500 can be performed by individual components, in parallel, and/or in an ongoing basis to form a pipeline of continuously updating information and actions. The method may be implemented by logic embodied in hardware, such as logic circuitry or one or more processors configured to execute instructions stored in a non-transitory, computer-readable medium. For example, the method 500 may be performed by the target distance determining logic 404 of FIG. 1, which may be implemented in the controller 106 shown in FIG. 1. The method 500 may be activated based on various conditions of the vehicle. For example, the method may begin executing when the vehicle is started, when the vehicle is put in gear by the driver, or when the vehicle starts moving. The method may begin at block 502.

At block 502, a list of detected object locations is obtained. The list may be obtained for example, from the vehicle's ADAS 410. In some embodiments, the list may be generated by the target distance determining logic 404 based on data received from the sensors 412 or the camera 402. The list of detected objects can include any object detected within the vicinity of the vehicle. Each object in the list of objects can include an identification number assigned by the system to the object, position coordinates describing the location of the object relative to the vehicle, and other possible descriptors.

At block 504, the list is filtered to select only those objects that are within a threshold distance. Filtering the list in this way ensures that objects that are too far from the vehicle to be of concern to the driver are eliminated from the list and will not affect the functioning of the see-through display. The threshold distance may be set to any suitable value, such as 20 feet, 30 feet, 50 feet, or more. The threshold distance may also be varied based on the speed of the vehicle. For example, the threshold distance can be reduced when travelling at slow speeds suitable for a parking lot, and the threshold distance can be increased when travelling at higher speeds suitable for a highway.

At block 506, a determination is made regarding whether the list is empty. If the list is empty, the process flow advances to block 508 and the current target location is maintained. The current target location may be the target location that was determined in a previous iteration of the method or, if the current iteration is the first iteration, then the current target location may be a predetermined default target location. If the list is not empty, the process flow advances to block 510.

At block 510, the closest object in the list is selected for further processing and the process flow advances to block 512. At block 512, a determination is made regarding whether the selected object is within the field of view of the camera. This can be determined by comparing the position coordinates of the selected object with the boundaries of the camera's view cone, which will be known based on the position and angle of the camera. If the selected object is not within the field of view of the camera, the process flow advances to block 514. At block 514, the selected object is removed from the list, and the process flow then returns to block 506.

Returning to block 512, if the selected object is within the field of view of the camera, the process flow advances to block 516. At block 516, the target location is updated to be the location of the object selected at block 510. The target distance to be used for the see-through display can be calculated based on the target location and sent to the image processing logic. The image processing logic can then use the target distance to process the captured images to determine what portion of the captured video is to be rendered on the see-through display.

The method 500 should not be interpreted as meaning that the blocks are necessarily performed in the order shown. Furthermore, fewer or greater actions can be included in the method 500 depending on the design considerations of a particular implementation.

Figure 6:
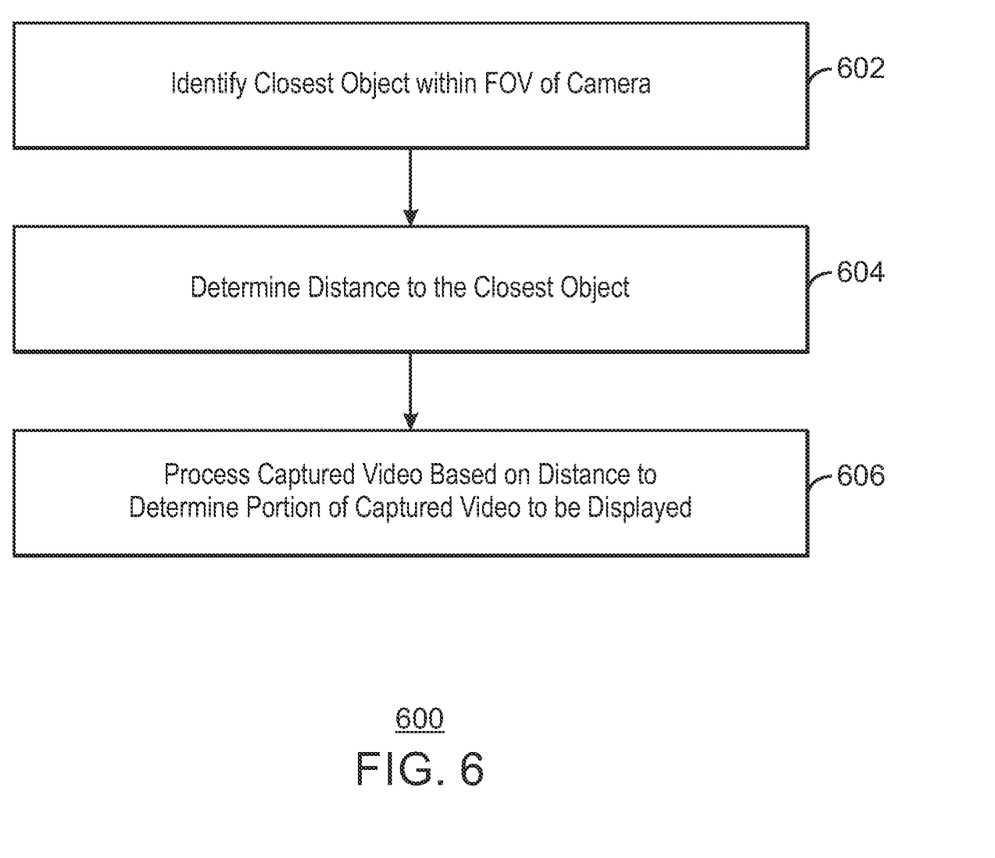
FIG. 6 is a process flow diagram summarizing an example method for operating a see-through display for a vehicle in accordance with embodiments.

FIG. 6 is a process flow diagram summarizing an example method for operating a see-through display for a vehicle in accordance with embodiments. Each of the functions of this method 600 can be performed by individual components, in parallel, and/or in an ongoing basis to form a pipeline of continuously updating information and actions. The method may be implemented by logic embodied in hardware, such as logic circuitry or one or more processors configured to execute instructions stored in a non-transitory, computer-readable medium. For example, the method 600 may be performed by the target distance determining logic 404 of FIG. 1, which may be implemented in the controller 106 shown in FIG. 1. The method may be activated based on various conditions of the vehicle. For example, the method may begin executing when the vehicle is started, when the vehicle is put in gear by the driver, or when the vehicle starts moving. The method may begin at block 602.

At block 602, the closest object within the field of view of a camera is identified. The camera referenced in this block is the camera used to capture video images for a see-through display. At block 604, the distance to the closest object is determined. This distance may be expressed as the distance between the camera and the closest object. However, other reference points other than the camera may be used. The determined distance is used as the target distance for processing the captured images. At block 606, the captured video is processed based on the distance to determine the portion of the captured video to be displayed. For example, processing the captured video can include determining how much of the captured image is to be cropped, such that the remaining portion fills the entire display screen of the see-through display.

While the invention may be susceptible to various modifications and alternative forms, specific embodiments have been shown by way of example. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A see-through system for a vehicle, comprising:
a video camera positioned to capture video related to a vehicle structure that blocks a view of a driver of the vehicle;
a see-through display disposed inside the vehicle between the vehicle structure and the driver; and
a processor configured to:
identify a closest object within a field of view of the video camera, wherein to identify the closest object comprises processing a list of objects in a vicinity of the vehicle, wherein the list of objects is received from an Automatic Driver Assistance System;
determine a distance to the closest object;
process the captured video based, at least in part, on the distance to determine a portion of the captured video to be displayed on the see-through display; and
render the portion of the captured video to create a see-through effect relative to the vehicle structure.

2. The see-through system of claim 1, wherein processing the list comprises filtering the list to discard objects that are past a maximum distance.

3. The see-through system of claim 1, wherein processing the list comprises comparing position coordinates of an object from the list with a view cone of the camera.

4. The see-through system of claim 1, wherein the video camera is a range camera and wherein to identify the closest object comprises receiving distance information from the video camera.

5. The see-through system of claim 1, wherein to process the captured video comprises cropping an outer portion of the captured video, wherein a size of the cropped area is proportional to the distance.

6. The see-through system of claim 1, wherein to process the captured video comprises determining the portion of the captured video to be displayed based additionally on an eye position of the driver.

7. The see-through system of claim 1, wherein the vehicle structure that blocks the view of the driver is an A-pillar.

8. The see-through system of claim 1, wherein the vehicle structure that blocks the view of the driver is a first A-pillar, the see-through system further comprising:
a second video camera positioned to capture video related to a second A-pillar; and
a second see-through display disposed inside the vehicle between the second A-pillar and the driver.

9. A method of operating a see-through system for a vehicle comprising:
identifying a closest object within a field of view of a video camera, wherein identifying the closest object comprises processing a list of objects in a vicinity of the vehicle, wherein the list of objects is received from an Automatic Driver Assistance System;
determining a distance to the closest object;
processing the video captured by the video camera based, at least in part, on the distance to determine a portion of the video to be displayed on a see-through display positioned between a driver and a vehicle structure that block the driver's view of the outside environment; and
rendering the portion of the video to create a see-through effect relative to the vehicle structure.

10. The method of claim 9, wherein processing the list comprises filtering the list to discard objects that are past a maximum distance.

11. The method of claim 9, wherein processing the list comprises comparing position coordinates of an object from the list with a view cone of the camera.

12. The method of claim 9, wherein the video camera is a range camera and wherein identifying the closest object comprises receiving distance information from the video camera.

13. The method of claim 9, wherein processing the video comprises cropping an outer portion of the video, wherein a size of the cropped area is proportional to the distance.

14. The method of claim 9, wherein the vehicle structure that block the driver's view of the outside environment is an A-pillar.

15. A non-transitory computer-readable medium comprising instructions to direct the actions of a processor to operate a see-through system of a vehicle, the instructions to direct the processor to:
identify a closest object within a field of view of a video camera, wherein to identify the closest object comprises processing a list of objects in a vicinity of the vehicle, wherein the list of objects is received from an Automatic Driver Assistance System;
determine a distance to the closest object;
process the video captured by the video camera based, at least in part, on the distance to determine a portion of the video to be displayed on a see-through display positioned between a driver and a vehicle structure that block the driver's view of the outside environment; and
render the portion of the video to create a see-through effect relative to the vehicle structure.

16. The non-transitory computer-readable medium of claim 15, wherein to identify the closest object comprises determining a list of objects in a vicinity of the vehicle, filtering the list to discard objects that are past a maximum distance, and comparing position coordinates of an object from the list with a view cone of the video camera.

17. The non-transitory computer-readable medium of claim 15, wherein to process the video comprises cropping an outer portion of the video, wherein a size of the cropped area is proportional to the distance.

18. The non-transitory computer-readable medium of claim 15, wherein to process the video comprises determining the portion of the video to be displayed additionally on an eye position of the driver.

* * * * *